United States Patent
Lopata et al.

(10) Patent No.: US 8,154,261 B2
(45) Date of Patent: Apr. 10, 2012

(54) POWER CONVERTER WITH POWER SWITCH OPERABLE IN CONTROLLED CURRENT MODE

(75) Inventors: Douglas D. Lopata, Boyertown, PA (US); Ashraf W. Lotfi, Bridgewater, NJ (US)

(73) Assignee: Enpirion, Inc., Bridgewater, NJ (US)

( * ) Notice: Subject to any disclaimer, the term of this patent is extended or adjusted under 35 U.S.C. 154(b) by 0 days.

(21) Appl. No.: 12/707,420

(22) Filed: Feb. 17, 2010

(65) Prior Publication Data

US 2010/0141228 A1    Jun. 10, 2010

Related U.S. Application Data

(63) Continuation of application No. 12/103,993, filed on Apr. 16, 2008, now Pat. No. 7,679,342.

(51) Int. Cl.
*G05F 1/613* (2006.01)
*G05F 1/00* (2006.01)
(52) U.S. Cl. ........................ 323/224; 323/284
(58) Field of Classification Search .................. 323/224, 323/283, 284, 285
See application file for complete search history.

(56) References Cited

U.S. PATENT DOCUMENTS

| | | | |
|---|---|---|---|
| 3,947,699 A | 3/1976 | Whitmer | |
| 4,016,461 A | 4/1977 | Roland | |
| 4,654,770 A | 3/1987 | Santurtûn et al. | |
| 4,761,725 A | 8/1988 | Henze | |
| 4,801,816 A | 1/1989 | Merlo et al. | |
| 4,912,622 A | 3/1990 | Steigerwald et al. | |
| 4,982,353 A | 1/1991 | Jacob et al. | |
| 5,245,228 A | 9/1993 | Harter | |
| 5,258,662 A | 11/1993 | Skovmand | |
| 5,285,369 A | 2/1994 | Balakrishnan | |
| 5,371,415 A | 12/1994 | Dixon et al. | |
| 5,414,341 A | 5/1995 | Brown | |
| 5,469,334 A | 11/1995 | Balakrishnan | |
| 5,481,219 A | 1/1996 | Jacobs et al. | |
| 5,510,739 A | 4/1996 | Caravella et al. | |
| 5,541,541 A | 7/1996 | Salamina et al. | |
| 5,548,206 A * | 8/1996 | Soo | 323/284 |
| 5,568,044 A | 10/1996 | Bittner | |
| 5,592,072 A | 1/1997 | Brown | |
| 5,594,324 A | 1/1997 | Canter et al. | |
| 5,625,312 A | 4/1997 | Kawakami et al. | |

(Continued)

OTHER PUBLICATIONS

Barrado, A., et al., "New DC/DC Converter with Low Output Voltage and Fast Transient Response," Proceedings of the IEEE Applied Power Electronics Conference, 2003, pp. 432-437, IEEE, Los Alamitos, CA.

(Continued)

*Primary Examiner* — Shawn Riley
(74) *Attorney, Agent, or Firm* — Slater & Matsil, L.L.P.

(57) ABSTRACT

A power converter and method of controlling a power switch therein to improve power conversion efficiency at low output current. In one embodiment, the power converter includes a first power switch coupled to a source of electrical power and a second power switch coupled to the first power switch and to an output terminal of the power converter. The power converter also includes a controller configured to alternately enable conduction of the first and the second power switches with a duty cycle in response to an output characteristic of the power converter. The controller is configured to control a level of current in the first power switch when the second power switch is substantially disabled to conduct.

20 Claims, 5 Drawing Sheets

U.S. PATENT DOCUMENTS

| | | |
|---|---|---|
| 5,689,213 A | 11/1997 | Sher |
| 5,796,276 A | 8/1998 | Phillips et al. |
| 5,864,225 A | 1/1999 | Bryson |
| 5,877,611 A | 3/1999 | Brkovic |
| 5,912,589 A | 6/1999 | Khoury et al. |
| 5,977,811 A | 11/1999 | Magazzú |
| 6,005,377 A | 12/1999 | Chen et al. |
| 6,101,218 A | 8/2000 | Nagano |
| 6,118,351 A | 9/2000 | Kossives et al. |
| 6,169,433 B1 | 1/2001 | Farrenkopf |
| 6,201,429 B1 | 3/2001 | Rosenthal |
| 6,211,706 B1 | 4/2001 | Choi et al. |
| 6,222,403 B1 | 4/2001 | Mitsuda |
| 6,255,714 B1 | 7/2001 | Kossives et al. |
| 6,262,564 B1 | 7/2001 | Kanamori |
| 6,285,209 B1 | 9/2001 | Sawai |
| 6,285,539 B1 | 9/2001 | Kashimoto et al. |
| 6,320,449 B1 | 11/2001 | Capici et al. |
| 6,388,468 B1 | 5/2002 | Li |
| 6,407,579 B1 | 6/2002 | Goswick |
| 6,407,594 B1 | 6/2002 | Milazzo et al. |
| 6,452,368 B1 | 9/2002 | Basso et al. |
| 6,477,065 B2 | 11/2002 | Parks |
| 6,495,019 B1 | 12/2002 | Filas et al. |
| 6,541,819 B2 | 4/2003 | Lotfi et al. |
| 6,552,629 B2 | 4/2003 | Dixon et al. |
| 6,570,413 B1 | 5/2003 | Kumagai et al. |
| 6,573,694 B2 | 6/2003 | Pulkin et al. |
| 6,580,258 B2 | 6/2003 | Wilcox et al. |
| 6,621,256 B2 * | 9/2003 | Muratov et al. ............... 323/282 |
| 6,639,427 B2 | 10/2003 | Dray et al. |
| 6,650,169 B2 | 11/2003 | Faye et al. |
| 6,661,216 B1 | 12/2003 | Grant et al. |
| 6,693,805 B1 | 2/2004 | Steigerwald et al. |
| 6,759,836 B1 | 7/2004 | Black, Jr. |
| 6,791,305 B2 | 9/2004 | Imai et al. |
| 6,822,882 B1 | 11/2004 | Jacobs et al. |
| 6,828,825 B2 | 12/2004 | Johnson et al. |
| 6,879,137 B2 | 4/2005 | Sase et al. |
| 6,922,044 B2 | 7/2005 | Walters et al. |
| 6,984,968 B2 | 1/2006 | Moon |
| 7,015,544 B2 | 3/2006 | Lotfi et al. |
| 7,019,505 B2 | 3/2006 | Dwarakanath et al. |
| 7,038,438 B2 | 5/2006 | Dwarakanath et al. |
| 7,038,514 B2 | 5/2006 | Leith et al. |
| 7,061,217 B2 | 6/2006 | Bayer et al. |
| 7,148,670 B2 | 12/2006 | Inn et al. |
| 7,190,150 B2 | 3/2007 | Chen et al. |
| 7,214,985 B2 | 5/2007 | Lotfi et al. |
| 7,230,302 B2 | 6/2007 | Lotfi et al. |
| 7,319,311 B2 | 1/2008 | Nishida |
| 7,330,017 B2 | 2/2008 | Dwarakanath et al. |
| 7,352,162 B1 | 4/2008 | Chang et al. |
| 7,482,795 B2 | 1/2009 | Parto et al. |
| 7,482,796 B2 | 1/2009 | Nishida |
| 7,501,805 B2 | 3/2009 | Chen et al. |
| 7,521,907 B2 | 4/2009 | Cervera et al. |
| 7,522,432 B2 | 4/2009 | Shimizu |
| 7,612,603 B1 | 11/2009 | Petricek et al. |
| 7,642,762 B2 | 1/2010 | Xie et al. |
| 7,676,402 B2 | 3/2010 | Moody |
| 7,679,342 B2 * | 3/2010 | Lopata et al. ............... 323/224 |
| 7,710,093 B2 | 5/2010 | Dwarakanath et al. |
| 7,714,558 B2 * | 5/2010 | Wu .............................. 323/284 |
| 7,728,573 B2 * | 6/2010 | Capilla et al. ............... 323/288 |
| 7,733,072 B2 | 6/2010 | Kanakubo |
| 7,746,041 B2 | 6/2010 | Xu et al. |
| 7,893,676 B2 | 2/2011 | Hanna |
| 7,936,160 B1 | 5/2011 | Sheehan |
| 7,948,280 B2 | 5/2011 | Dwarakanath et al. |
| 8,013,580 B2 | 9/2011 | Cervera et al. |
| 2002/0175661 A1 | 11/2002 | Wheeler et al. |
| 2004/0169498 A1 | 9/2004 | Goder et al. |
| 2005/0046405 A1 | 3/2005 | Trafton et al. |
| 2005/0088216 A1 | 4/2005 | Arndt et al. |
| 2005/0167756 A1 | 8/2005 | Lotfi et al. |
| 2005/0168203 A1 | 8/2005 | Dwarakanath et al. |
| 2005/0168205 A1 | 8/2005 | Dwarakanath et al. |
| 2005/0169024 A1 | 8/2005 | Dwarakanath et al. |
| 2006/0038225 A1 | 2/2006 | Lotfi et al. |
| 2006/0132217 A1 | 6/2006 | Lou et al. |
| 2007/0210777 A1 | 9/2007 | Cervera et al. |
| 2008/0018366 A1 | 1/2008 | Hanna |
| 2008/0094114 A1 | 4/2008 | Dwarakanath et al. |
| 2008/0106246 A1 | 5/2008 | Dwarakanath et al. |
| 2009/0167267 A1 | 7/2009 | Dwarakanath et al. |
| 2009/0212751 A1 | 8/2009 | Cervera et al. |
| 2010/0164650 A1 | 7/2010 | Abou-Alfotouh et al. |
| 2011/0095742 A1 | 4/2011 | Lopata et al. |
| 2011/0101933 A1 | 5/2011 | Lopata et al. |
| 2011/0101934 A1 | 5/2011 | Lopata et al. |
| 2011/0101948 A1 | 5/2011 | Lopata et al. |
| 2011/0101949 A1 | 5/2011 | Lopata et al. |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Jul. 1997, pp. 72-74, Cancun, Mexico.

Goder, D., et al., "V2 Architecture Provides Ultra-Fast Transient Response in Switch Mode Power Supplies," Proceedings of HFPC Power Conversion, 1996, pp. 414-420.

Goodman, J. et al., "An Energy/Security Scalable Encryption Processor Using an Embedded Variable Voltage DC/DC Converter," IEEE Journal of Solid-State Circuits, Nov. 1998, vol. 33, No. 11, IEEE, Los Alamitos, CA.

Horowitz, P., et al., "The Art of Electronics," Second Edition, 1989, pp. 288-291, Cambridge University Press, Cambridge, MA.

"Linear Technology: LTC3736-1: Dual 2-Phase, No RSENSETM, Synchronous Controller with Spread Spectrum," 2004, 28 pp., Linear Technology Corporation, Milpitas, CA.

Lotfi, A.W., et al., "Issues and Advances in High-Frequency Magnetics for Switching Power Supplies," Proceedings of the IEEE, Jun. 2001, vol. 89, No. 6, pp. 833-845, IEEE, Los Alamitos, CA.

Patella, B.J., et al., "High-Frequency Digital Controller IC for DC/DC Converters," IEEE Proceedings of the Applied Power Electronics Conference, Mar. 10, 2002, 7 pp., IEEE, Los Alamitos, CA.

Peterchev, A.V., et al., "Quantization Resolution and Limit Cycling in Digitally Controlled PWM Converters," IEEE Transactions on Power Electronics, Jan. 2003, pp. 301-303, vol. 18, No. 1, IEEE, Los Alamitos, CA.

Redl, R., et al., "Optimizing the Load Transient Response of the Buck Converter," Proceedings of the IEEE Applied Power Electronics Conference, 1998, pp. 170-176, IEEE, Los Alamitos, CA.

Schoneman, G.K., et al., "Output Impedance Considerations for Switching Regulators with Current-Injected Control," Proceedings of the 18th Annual IEEE Power Electronics Specialists Conference, Jun. 1987, pp. 324-335, IEEE, Los Alamitos, CA.

Soto, A., et al. "Analysis of the Buck Converter for Scaling the Supply Voltage of Digital Circuits," Proceedings of the IEEE Applied Power Electronics Conference, 2003, pp. 711-717, IEEE, Los Alamitos, CA.

Soto, A., et al., "Design Methodology for Dynamic Voltage Scaling in the Buck Converter," Proceedings of the IEEE Applied Power Electronics Conference, 2005, pp. 263-269, IEEE, Los Alamitos, CA.

"TPS40100: Midrange Input Synchronous Buck Controller with Advanced Sequencing and Output Margining," May 2005, 37 pp., Texas Instruments Incorporated, Dallas, TX.

Zhou, X., et al., "Improved Light-Load Efficiency for Synchronous Rectifier Voltage Regulation Module," IEEE Transactions on Power Electronics, Sep. 2000, pp. 826-834, vol. 15, No. 5, IEEE, Los Alamitos, CA.

\* cited by examiner ies of roughly 40-70% in many applications. The use of active power switches in many recent power converter designs, particularly as synchronous rectifiers for low output voltages, has increased operating efficiency at full rated load to 90% or more.

POWER CONVERTER WITH POWER SWITCH OPERABLE IN CONTROLLED CURRENT MODE

This application is a continuation of patent application Ser. No. 12/103,993, entitled "Power Converter with Power Switch Operable in Controlled Current Mode," filed on Apr. 16, 2008, now U.S. Pat. No. 7,679,342, which application is incorporated herein by reference.

TECHNICAL FIELD

The present invention is directed, in general, to power electronics and, more specifically, to a power converter and method of controlling a power switch therein to improve power conversion efficiency at low output current.

BACKGROUND

A switch-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the power switches of the power converter. The duty cycle is a ratio represented by a conduction period of a power switch to a switching period thereof. Thus, if a power switch conducts for half of the switching period, the duty cycle for the power switch would be 0.5 (or 50%). Additionally, as voltage or current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

In an exemplary application, the power converters have the capability to convert an unregulated input voltage, such as five volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor to the voltage source at a switching frequency that may be on the order of five megahertz.

In typical applications of dc-dc power converters, power conversion efficiency is an important parameter that directly affects the physical size of the end product, its cost and market acceptance. Active power switches that are either fully on with low forward voltage drop or fully off with minimal leakage current provide a recognized advantage for power conversion efficiency in comparison with previous designs that utilized a dissipative "pass" transistor to regulate an output characteristic or a passive diode to provide a rectification function. Previous designs using pass transistors and passive diodes produced operating power conversion efficiencies of roughly 40-70% in many applications. The use of active power switches in many recent power converter designs, particularly as synchronous rectifiers for low output voltages, has increased operating efficiency at full rated load to 90% or more.

A continuing problem with power converters is preserving power conversion efficiency at low levels of output current. Low efficiency at low output currents is a result of power inherently lost by parasitic elements in the power switches and by losses induced in reactive circuit elements, particularly inductors coupled to the active power switches. Further losses are also generated in the control and drive circuits coupled to the active power switches. Ultimately, as the output current of a power converter approaches zero, the fixed losses in the power switches, the inductive circuit elements, and the control circuits cause power conversion efficiency also to approach zero.

Various approaches are known to improve power conversion efficiency at low output currents. One approach used with resonant power conversion topologies reduces switching frequency of active power switches for low output current. Another approach, as described by X. Zhou, et al., in the paper entitled "Improved Light-Load Efficiency for Synchronous Rectifier Voltage Regulation Module," IEEE Transactions on Power Electronics, Volume 15, Number 5, September 2000, pp. 826-834, which is incorporated herein by reference, utilizes duty cycle adjustments to adjust switching frequency or to disable a synchronous rectifier switch. A further approach, as described by M. E. Wilcox, et al. ("Wilcox"), in U.S. Pat. No. 6,580,258, entitled "Control Circuit and Method for Maintaining High Efficiency Over Broad Current Ranges in a Switching Regulator Circuit," issued Jun. 17, 2003, which is incorporated herein by reference, generates a control signal to intermittently turn off one or more active power switches under light load operating conditions when the output voltage of the power converter can be maintained at a regulated voltage by the charge on an output capacitor. Of course, when an output voltage from a power converter is temporarily discontinued, such as when the load coupled thereto is not performing an active function, the power converter can be disabled by an enable/disable signal, generated either at a system or manual level, which is a process commonly used, even in quite early power converter designs.

However, resonant power conversion topologies are frequently a poor choice in many applications due to an inherently disadvantageous waveform structure in resonant circuits and the resulting inefficient use of semiconductor power switches required to execute the resonant power conversion process at high levels of load current. Intermittently turning off one or more active power switches under light load operating conditions as described by Wilcox still generates associated switching losses when the active power switches are periodically operated to maintain charge on an output filter capacitor. Thus, the problem of providing high power conversion efficiency at light load currents still remains an unresolved issue.

Accordingly, what is needed in the art is a power converter and related method to provide high power conversion efficiency in a switch-mode power converter, especially at light load currents, that overcomes deficiencies in the prior art.

SUMMARY OF THE INVENTION

These and other problems are generally solved or circumvented, and technical advantages are generally achieved, by advantageous embodiments of the present invention, including a power converter and method of controlling a power switch therein to improve power conversion efficiency at low output current. In one embodiment, the power converter includes a first power switch coupled to a source of electrical power and a second power switch coupled to the first power switch and to an output terminal of the power converter. The power converter also includes a controller configured to alternately enable conduction of the first and the second power switches with a duty cycle in response to an output characteristic of the power converter. The controller is configured to control a level of current in the first power switch when the second power switch is substantially disabled to conduct.

In another aspect, the present invention provides a method of operating a power converter including coupling a first power switch to a source of electrical power and coupling a second power switch to the first power switch and to an output terminal of the power converter. The method also includes alternately enabling conduction of the first and the second power switches with a duty cycle in response to an output characteristic of the power converter. The method further includes controlling a level of current in the first power switch when the second power switch is substantially disabled to conduct.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIG. 2 illustrates a diagram of portions of the power converter illustrated in

FIG. 1 constructed according to the principles of the present invention;

Corresponding numerals and symbols in the different figures generally refer to corresponding parts unless otherwise indicated, and may not be redescribed in the interest of brevity after the first instance. The FIGUREs are drawn to clearly illustrate the relevant aspects of exemplary embodiments.

DETAILED DESCRIPTION OF ILLUSTRATIVE EMBODIMENTS

The making and using of the presently exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a controller responsive to a level of output current to regulate an output characteristic and methods of forming the same. While the principles of the present invention will be described in the environment of a power converter, any application that may benefit from a power converter, such as a power amplifier, including a controller responsive to a level of current to regulate an output characteristic is well within the broad scope of the present invention.

Figure 1:
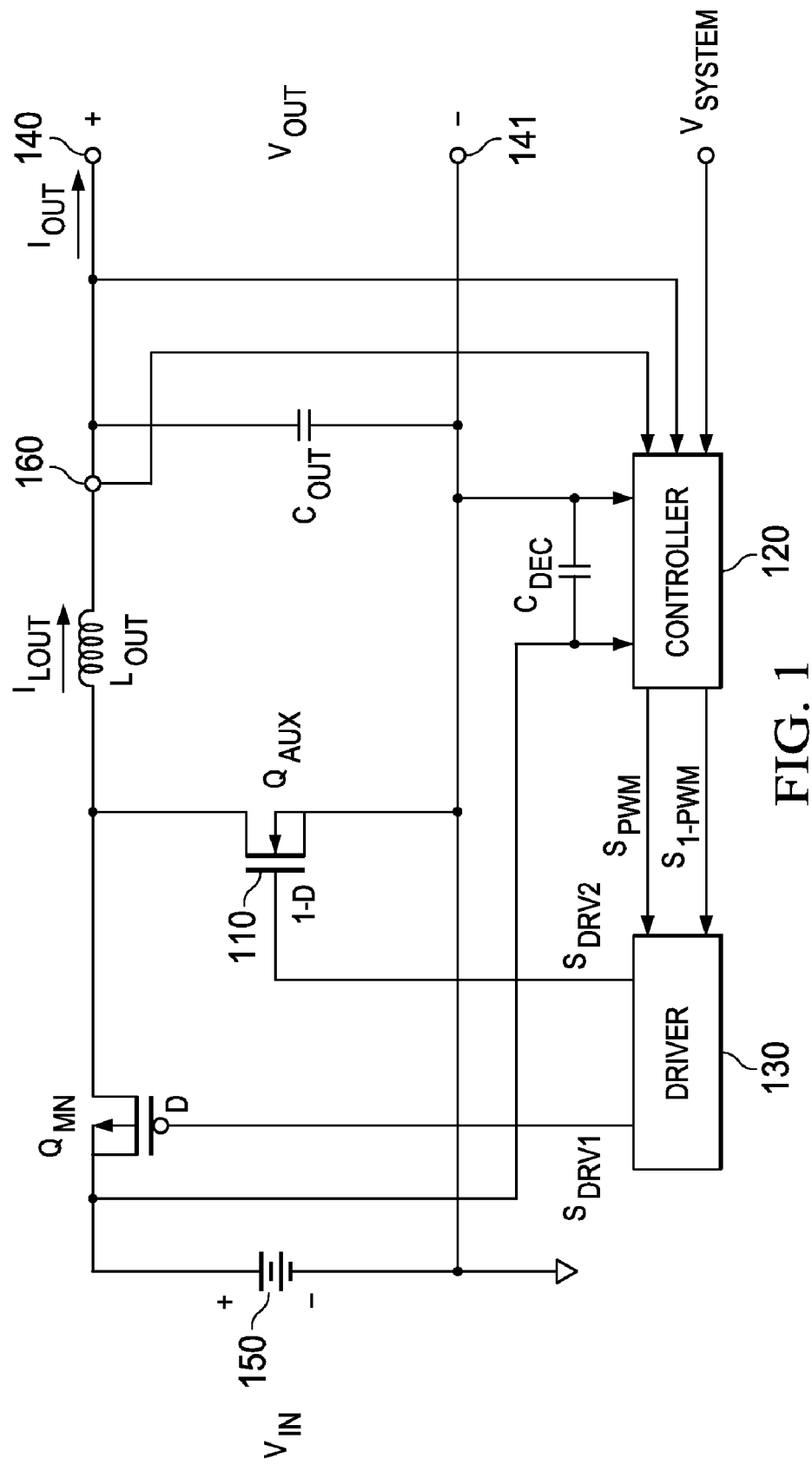
FIG. 1 illustrates a diagram of an embodiment of a power converter constructed according to the principles of the present invention.

Referring initially to FIG. 1, illustrated is a diagram of an embodiment of a power converter constructed according to the principles of the present invention. The power converter includes a power train 110, a controller 120, and a driver (e.g., a gate driver) 130, and provides power to a system/load such as a microprocessor (not shown) coupled to output terminals 140, 141. The controller 120 is responsive to a level of output current to regulate an output characteristic of the power converter. While in the illustrated embodiment the power train 110 employs a buck converter topology, those skilled in the art should understand that other converter topologies such as a forward converter topology are well within the broad scope of the present invention.

The power train 110 of the power converter receives an input voltage $V_{in}$ from a source of electrical power (represented by battery 150) at an input thereof and provides a regulated output voltage $V_{out}$ at the output terminals 140, 141, or other output characteristic such as an output current $I_{out}$. In keeping with the principles of a buck converter topology, the output voltage $V_{out}$ is generally less than the input voltage $V_{in}$ such that a switching operation of the power converter can regulate the output voltage $V_{out}$.

In a first mode of operation wherein substantial output current $I_{out}$ is delivered to the output terminals 140, 141, a main power switch $Q_{mn}$ [e.g., a p-channel metal oxide semiconductor field effect transistor ("MOSFET") embodied in a p-type laterally diffused metal oxide semiconductor ("P-LDMOS") device], is enabled to conduct in response to a gate drive signal $S_{DRV1}$ for a primary interval (generally co-existent with a primary duty cycle "D" of the main power switch $Q_{mn}$) and couples the input voltage $V_{in}$ to an output filter inductor $L_{out}$. During the primary interval, an inductor current $I_{Lout}$ flowing through the output filter inductor $L_{out}$ increases as current flows from the input to the output of the power train 110. An ac component of the inductor current $I_{Lout}$ is filtered by an output capacitor $C_{out}$ to provide the output current $I_{out}$ at an output of the power converter. The power converter generally operates in the first mode of operation, for example and without limitation, when the output current $I_{out}$ is of sufficient magnitude that current in the output filter inductor $L_{out}$ or in a power switch does not reverse direction.

During a complementary interval during the first mode of operation (generally co-existent with a complementary duty cycle "1-D" of the main power switch $Q_{mn}$), the main power switch $Q_{mn}$ is transitioned to a non-conducting state and an auxiliary power switch $Q_{aux}$ [e.g., an n-channel MOSFET embodied in an n-type laterally diffused metal oxide semiconductor ("N-LDMOS") device], coupled to the output filter inductor $L_{out}$, is enabled to conduct in response to a gate drive signal $S_{DRV2}$. The auxiliary power switch $Q_{aux}$ provides a path to maintain a continuity of the inductor current $I_{Lout}$ flowing through the output filter inductor $L_{out}$. During the complementary interval, the inductor current $I_{Lout}$ flowing through the output filter inductor $L_{out}$ decreases. In general, during the first mode of operation, the duty cycle of the main and auxiliary power switches $Q_{mn}$, $Q_{aux}$ may be adjusted to maintain a regulation of the output voltage $V_{out}$ of the power converter. Those skilled in the art should understand, however, that the conduction periods for the main and auxiliary power switches $Q_{mn}$, $Q_{aux}$ aux may be separated by a small time interval to avoid cross conduction therebetween and beneficially to reduce the switching losses associated with the power converter. Those skilled in the art should understand further that terms used herein such as "current reversal" or a reference to a particular level of a physical quantity such as "zero current" are to be understood within the context of a physical apparatus with attendant and practical accuracy limitations. For example, one cannot know or measure the precise instant that a current that reverses direction passes through a current level of zero.

The controller 120 of the power converter receives an output characteristic (e.g., the output current $I_{out}$ and/or the output voltage $V_{out}$) of the power converter, and a desired output characteristic such as a desired system voltage $V_{system}$ from an internal source or from an external source that may be associated with the load. In an advantageous embodiment, the controller 120 may be coupled to a current sensor, such as current sensor 160 to sense a power converter current such as an output filter inductor current $I_{Lout}$ or an output current $I_{out}$. In a further advantageous embodiment, the controller 120 may be coupled to a current sensor to sense a current in a power switch. Thus, a current sensor 160 may be employed by controller 120 to select the first mode of operation of the power converter by comparing a sensed current with a fixed or adjustable current threshold level.

The controller 120 may also be coupled to an input characteristic (e.g., the input voltage $V_{in}$) of the power converter and to a return lead of the source of electrical power (again, represented by battery 150) as illustrated in FIG. 1 to provide a ground connection therefor. While only a single ground connection is illustrated in the present embodiment, those skilled in the art should understand that multiple ground connections may be employed for use within the controller 120. A decoupling capacitor $C_{dec}$ may be coupled as illustrated in the FIGURE to the path from the input voltage $V_{in}$ to the controller 120. The decoupling capacitor $C_{dec}$ is generally configured to absorb high frequency noise signals associated with the source of electrical power to protect the controller 120.

In accordance with the aforementioned characteristics, during the first mode of operation the controller 120 provides a signal (e.g., a pulse-width modulated signal $S_{PWM}$) to control a duty cycle and a frequency of the main and auxiliary power switches $Q_{mn}$, $Q_{aux}$ of the power train 110 to regulate the output voltage $V_{out}$ or other output characteristic thereof. The controller 120 in some applications may also provide a complement of the pulse-width modulated signal $S_{PWM}$ during the first mode of operation (e.g., a complementary pulse-width modulated signal $S_{1-PWM}$) in accordance with the aforementioned characteristics. Any controller adapted to control at least one power switch of the power converter is well within the broad scope of the present invention. As an example, a controller employing digital circuitry is disclosed in U.S. Pat. No. 7,038,438, entitled "Controller for a Power Converter and a Method of Controlling a Switch Thereof," to Dwarakanath, et al., issued May 2, 2006, and U.S. Pat. No. 7,019,505, entitled "Digital Controller for a Power Converter Employing Selectable Phases of a Clock Signal," to Dwarakanath, et al., issued Mar. 28, 2006, which are incorporated herein by reference.

The power converter also includes a driver (e.g., a gate driver) 130 to provide gate drive signals $S_{DRV1}$, $S_{DRV2}$ to control conductivity of the main and auxiliary power switches $Q_{mn}$, $Q_{aux}$, respectively, responsive to the pulse-width modulated signal $S_{PWM}$ (and, if necessary, to control the complementary pulse-width modulated signal $S_{1-PWM}$) provided by the controller 120. There are a number of viable alternatives to implement a driver 130 that include techniques to provide sufficient signal delays to prevent crosscurrents when controlling multiple power switches in the power converter. The driver 130 typically includes switching circuitry incorporating a plurality of driver switches that cooperate to provide the drive signals $S_{DRV1}$, $S_{DRV2}$ to the main and auxiliary power switches $Q_{mn}$, $Q_{aux}$. Of course, any driver 130 capable of providing the drive signals $S_{DRV1}$, $S_{DRV2}$ to control a power switch is well within the broad scope of the present invention. As an example, a driver is disclosed in U.S. Pat. No. 7,330,017, to Dwarakanath, et al., entitled "Driver for a Power Converter and a Method of Driving a Switch Thereof," issued Feb. 12, 2008, and a power switch is disclosed in U.S. Pat. No. 7,230,302, entitled "Laterally Diffused Metal Oxide Semiconductor Device and Method of Forming the Same," to Lotfi, et al., issued Jun. 12, 2007 and in U.S. Pat. No. 7,214,985, entitled "Integrated Circuit Incorporating Higher Voltage Devices and Low Voltage Devices Therein," to Lotfi, et al., issued May 8, 2007, which are incorporated herein by reference.

According to the principles of the present invention, the main and auxiliary power switches $Q_{mn}$, $Q_{aux}$ are typically power switches that can be incorporated into a semiconductor device in an integrated circuit proximate control or signal processing devices that perform many of the control functions of the controller 120 of the power converter. The control and signal processing devices are typically complementary metal-oxide semiconductor ("CMOS") devices such as p-type metal oxide semiconductor ("PMOS") devices and n-type metal oxide semiconductor ("NMOS") devices. The PMOS and NMOS devices may also be referred to as p-channel and n-channel MOSFETs, respectively.

In a switch-mode power converter, such as the buck power converter illustrated and described with reference to FIG. 1, the duty cycle of a power switch, such as the main power switch $Q_{mn}$ previously described herein, determines the steady-state ratio of a power converter output voltage $V_{out}$ to its input voltage $V_{in}$. In particular, for a buck power converter topology operating in a continuous conduction mode, the duty cycle determines the ratio of output voltage to input voltage (ignoring certain losses within the power converter) according to the equation:

$$D = V_{out}/V_{in}. \qquad (1)$$

In an alternative power converter topology, such as a boost topology, the duty cycle determines the ratio of output to input voltage (again, ignoring certain losses within the power converter) operating in a continuous conduction mode ("CCM") according to the equation:

$$D = V_{in}/V_{out}. \qquad (2)$$

This reciprocal relationship for the ratio of input and output voltages of buck and boost topologies recognizes that a buck power converter topology employing synchronous rectifiers is operable as a boost topology with its input and output reversed, and vice versa. Other switch-mode power converter topologies such as a buck-boost, forward, Cúk, etc., are characterized by further relationships, well known in the art, for a ratio of output voltage to input voltage, for a particular operating condition such as CCM.

A controller, such as controller 120 illustrated in FIG. 1, typically regulates an output characteristic of a power converter by controlling a duty cycle of a power switch. The duty cycle is generally controlled by comparing a sawtooth voltage waveform with a controlled threshold voltage produced by an error amplifier configured to sense an output voltage or other output characteristic.

A load coupled to a power converter may sometimes operate for a period of time in an idle mode wherein the load draws a relatively small but non-zero current from the power converter, for example, less than 1% of its normal load current. Under such operating conditions, wherein power conversion efficiency of the power converter is typically very low, it is preferable to provide high power conversion efficiency, particularly when the power converter is powered from a portable energy source such as a battery.

Figure 2:
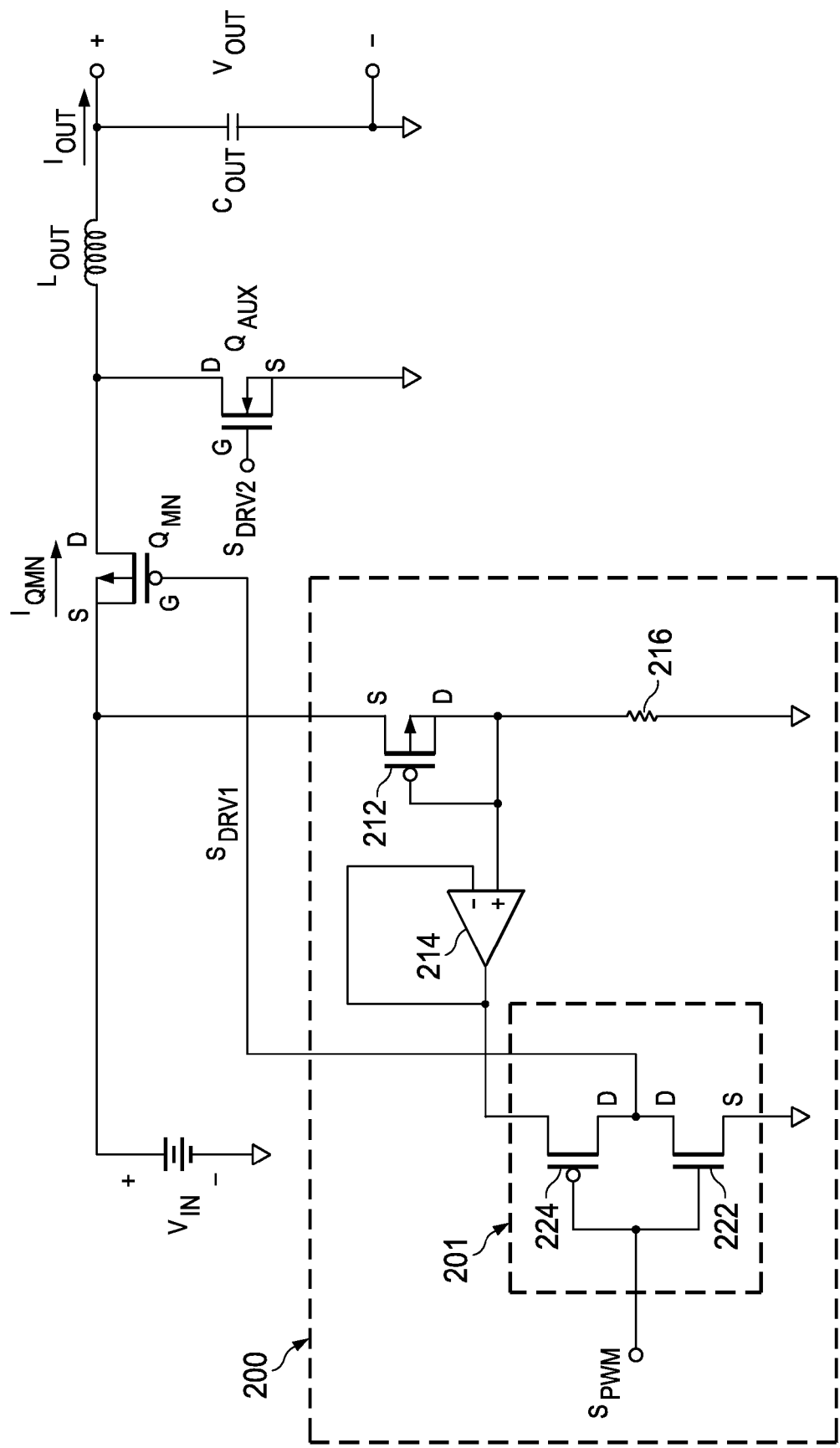

Referring to FIG. 2, illustrated is a diagram of portions of the power converter illustrated in FIG. 1 constructed according to the principles of the present invention. A switch-current controller 200 of the power converter is configured to control a current flowing through a main power switch $Q_{mn}$ during the complementary duty cycle 1-D of a switching cycle. The switch-current controller 200 includes a gate driver 201 for the main power switch $Q_{mn}$. The gate driver 201 includes driver switches such as a p-channel field-effect transistor ("FET") 224 and an n-channel FET 222, with their gates coupled together and driven by a pulse-width modulated signal $S_{PWM}$. The pulse-width modulated signal $S_{PWM}$ may be created by a controller such as the controller 120 illustrated and described with respect to FIG. 1. The source, gate, and drain of the respective driver switches are labeled with "s," "g," and "d," respectively.

Producing a current flowing through the main power switch $Q_{mn}$ during the complementary duty cycle 1-D of a switching cycle when a power converter is lightly loaded, such as producing less than 5% of its rated output power, can provide substantial efficiency improvement over a switching mode wherein both the main and auxiliary power switches $Q_{mn}$, $Q_{aux}$ are continuously enabled to conduct in complementary intervals of time. A switching mode wherein the main and auxiliary power switches $Q_{mn}$, $Q_{aux}$ are enabled to conduct in complementary intervals of time can produce substantial bidirectional current through reactive circuit elements, such as an output inductor $L_{out}$, contributing thereby substantial power losses. In addition, producing a light current flowing through the main power switch $Q_{mn}$ during the complementary duty cycle 1-D of a switching cycle when a power converter is lightly loaded can be a more economical alternative than providing a large output capacitance to maintain an output voltage $V_{out}$ of a power converter during a mode of operation wherein all switching is temporarily disabled.

The switch-current controller 200 illustrated in FIG. 2 is configured to control a gate voltage for the main power switch $Q_{mn}$ when it would ordinarily be disabled to conduct (i.e., during the complementary duty cycle 1-D of a switching cycle). The gate voltage of the main power switch $Q_{mn}$ is controlled during the complementary duty cycle 1-D of a switching cycle so that the main power switch $Q_{mn}$ can conduct a light current to the load (i.e., an output current $I_{out}$ of the power converter).

When the pulse-width modulated signal $S_{PWM}$ is high, the gate driver 201 couples the gate of the main power switch $Q_{mn}$ to ground, turning it on. When pulse-width modulated signal $S_{PWM}$ is low, the gate driver 201 couples the gate of the main power switch $Q_{mn}$ to the output of an operational amplifier 214. The output of the operational amplifier 214 is controlled to enable the main power switch $Q_{mn}$ to conduct a controlled, light current when the pulse-width modulated signal $S_{PWM}$ is low.

A p-channel FET 212 with its gate coupled to its drain operates as a diode in forward conduction. The drain current of the p-channel FET 212 is controlled by a resistor 216, which is coupled substantially across the input voltage $V_{in}$ (less the diode drop of the p-channel FET 212). Thus, the gate of the p-channel FET 212 is set to the voltage with respect to its source that is necessary to conduct the current flowing through the resistor 216. This gate voltage is sensed with the operational amplifier 214 and coupled to the gate of the main power switch $Q_{mn}$ during the complementary duty cycle 1-D of a switching cycle. Thus, the p-channel FET 212 and the main power switch $Q_{mn}$ operate as a current mirror during the complementary duty cycle 1-D of a switching cycle, wherein a current controlled by the resistor 216 and scaled by a die geometric ratio of the main power switch $Q_{mn}$ to the p-channel FET 212 flows through the main power switch $Q_{mn}$. Preferably, the p-channel FET 212 and the main power switch $Q_{mn}$ are produced in a common manufacturing process and are configured to operate at substantially the same die temperature. Preferably, the p-channel FET 212 is a downscaled replica of the main power switch $Q_{mn}$. The operation of current mirrors is well known in the art, and will not be described further in the interest of brevity.

Figure 3:
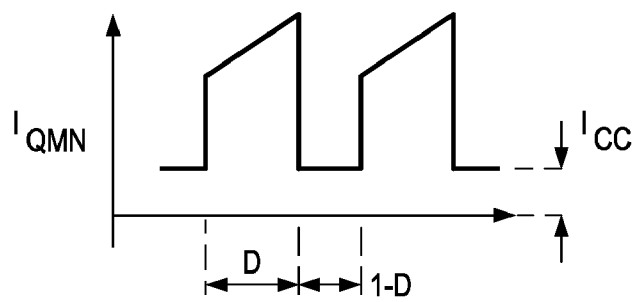
FIG. 3 illustrates a waveform diagram of an exemplary operation associated with a power switch of a power converter in accordance with the principles of the present invention.

Turning now to FIG. 3, illustrated is a waveform diagram of an exemplary operation associated with a power switch of a power converter in accordance with the principles of the present invention. In particular, the waveform represents a source-to-drain current $I_{Qmn}$ flowing through a power switch (e.g., the main power switch $Q_{mn}$ of FIG. 2) during a first mode of operation wherein the output current is of sufficient magnitude that current in an output inductor or in a semiconductor power switch does not reverse direction. During the primary duty cycle D of the switching cycle, the source-to-drain current $I_{Qmn}$ flowing through the main power switch $Q_{mn}$ increases substantially linearly due to the voltage applied across an output inductor (e.g., the output inductor $L_{out}$ of FIG. 2). During the complementary duty cycle 1-D of the switching cycle, the source-to-drain current $I_{Qmn}$ maintains a controlled, substantially constant current level $I_{CC}$ flowing through the main power switch $Q_{mn}$, that is controlled by a controller such as the switch-current controller 200 of FIG. 2.

Figure 4:
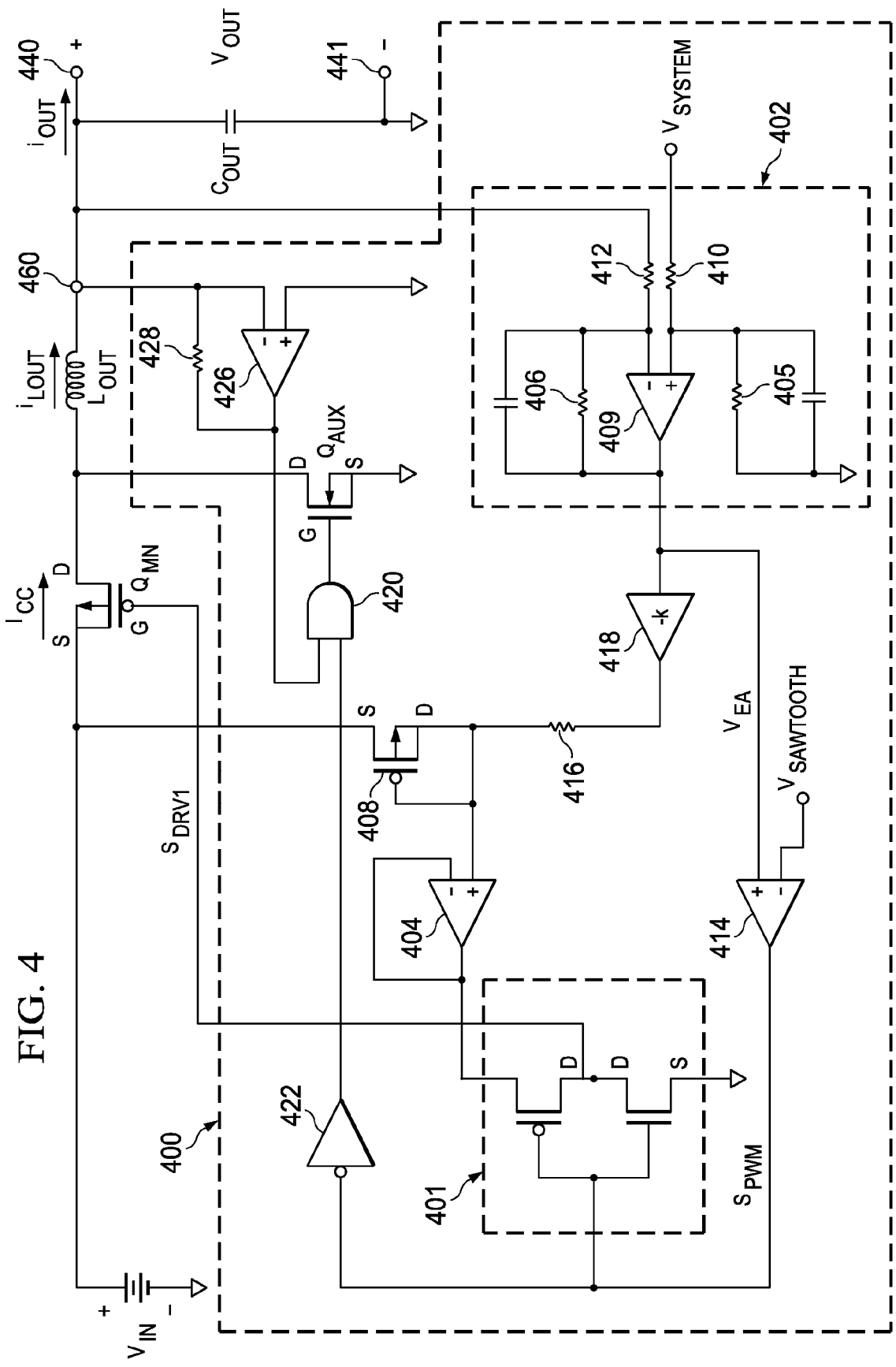
FIG. 4 illustrates a diagram of an embodiment of portions of a power converter constructed according to the principles of the present invention.

Turning now to FIG. 4, illustrated is a diagram of an embodiment of portions of a power converter constructed according to the principles of the present invention. A controller 400 of the power converter is operable in three modes. The controller 400 regulates an output characteristic of the power converter, and is configured to control current through a main power switch $Q_{mn}$ in response to a sensed or estimated power converter current. The controller 400 is advantageously operable to provide a mode of operation wherein improved power conversion efficiency is achieved at light load. Additionally, the power converter may experience an improvement in dynamic response because of an additional bias available to feed an output thereof that in turn produces a smaller decay of an output characteristic (e.g., an output voltage $V_{out}$) since the output voltage $V_{out}$ is not supplied only by an output capacitor $C_{out}$. The power converter includes an error amplifier 402 that senses the output voltage $V_{out}$ as an output characteristic to provide a feedback signal.

The primary and complementary duty cycles D and 1-D of a switching cycle are established by a comparator 414 that produces a pulse-width modulated signal $S_{PWM}$. The noninverting input of the comparator 414 is coupled to an error amplifier signal $V_{EA}$ of an inverter 418. The inverting input of the comparator 414 is coupled to a sawtooth waveform signal $V_{sawtooth}$ that has a substantial positive voltage offset for the waveform valleys.

In a first mode of operation wherein a substantial current is delivered to a load (not shown) coupled to output terminals 440, 441, the main and auxiliary power switches $Q_{mn}$, $Q_{aux}$ are alternately enabled to conduct, respectively, during a primary duty cycle D and a complimentary duty cycle 1-D. The primary duty cycle D and the complimentary duty cycle 1-D are controlled to regulate an output characteristic of the power converter. During the first mode of operation, the load current is of sufficient magnitude so that current flowing through output inductor $L_{out}$ does not reverse direction. During the complementary duty cycle 1-D, the main power switch $Q_{mn}$ conducts a current controlled by a current mirror including a gate driver 401, an operational amplifier 404, a p-channel FET 408 and a resistor 416. The current mirror is operable in a manner similar to that described with reference to FIG. 2. However, in the circuit illustrated in FIG. 4, the current through the main power switch $Q_{mn}$ is controlled by current flowing through the resistor 416. The resistor 416 is coupled to the error amplifier signal $V_{EA}$ of the inverter 418. The inverter 418 amplifies the output of the error amplifier 402 with gain −k. Thus, as the voltage of the error amplifier signal $V_{EA}$ is reduced, the current flowing through the resistor 416 is also reduced. Correspondingly, as the voltage of the error amplifier signal $V_{EA}$ is reduced, the current flowing through the main power switch $Q_{mn}$ during the complementary duty cycle 1-D of the switching cycle is also reduced.

The error amplifier 402 senses the output voltage $V_{out}$. The error amplifier 402 includes an operational amplifier 409 that includes feedback networks 405, 406. The feedback networks 405, 406 include a parallel arrangement of a capacitor and a resistor. The error amplifier 402 further includes input networks including resistors 410, 412. In a preferred embodiment, the values of components in feedback networks 405, 406 are equal, and the values of the resistors 410, 412 in the input networks are equal. The selection of component values for an error amplifier 402 to produce a stable response of a power converter in a particular application is well known in the art, and will not be described further in the interest of brevity. The error amplifier 402 generates the error amplifier signal $V_{EA}$ in response to the sensed output voltage $V_{out}$ of the power converter and a desired output voltage represented by signal $V_{system}$. Of course, different arrangements of feedback and input networks to meet the needs of a particular application including a voltage divider coupled across output terminals 440, 441 are well within the broad scope of the invention. Thus, in the first mode of operation, the controller 400 enables alternating conduction of the main and auxiliary power switches $Q_{mn}$, $Q_{aux}$ while enabling a controlled current flowing through the main power switch $Q_{mn}$ during the complementary duty cycle 1-D. The controlled current flowing through the main power switch $Q_{mn}$ is responsive to the error amplifier signal $V_{EA}$ produced by the error amplifier 402.

In a second mode of power converter operation, power converter output current $i_{out}$ is insufficient to sustain unidirectional current flow in output inductor $L_{out}$. Bidirectional current flow through inductor $L_{out}$ is prevented in the power converter illustrated in FIG. 4 by sensing an inductor current $i_{Lout}$ with a current sensor 460. The sensed inductor current $I_{Lout}$ is amplified with a transresistance amplifier that includes operational amplifier 426 coupled to feedback resistor 428. The gain of the transresistance amplifier is substantially the resistance of the resistor 428. The output of the transresistance amplifier is coupled to an input of an AND gate 420.

The output of the comparator 414 is coupled to a signal inverter 422. The signal inverter 422 produces a high output signal during the complementary duty cycle 1-D of the switching cycle. The output of the signal inverter 422 is coupled to the other input of the AND gate 420. Thus, the AND gate 420 produces a high gate signal for the auxiliary power switch $Q_{aux}$ to enable conduction therein during the complementary duty cycle 1-D of the switching cycle, when positive current flows through the output inductor $L_{out}$. The current mirror previously described continues to provide a gate drive signal for the main power switch $Q_{mn}$ to enable a current controlled by the error amplifier 402 to flow therethrough during the complementary duty cycle 1-D of the switching cycle. In this manner, during the second mode of power converter operation, a controlled current is enabled to flow through the main power switch $Q_{mn}$ when the auxiliary power switch $Q_{aux}$ is disabled to conduct during the complementary duty cycle 1-D of the switching cycle. The controller, therefore, is configured to control a level of current in the main power switch $Q_{mn}$ when the auxiliary power switch $Q_{aux}$ substantially disabled to conduct.

In a third mode of power converter operation, the output current $i_{out}$ is further reduced so that a source-to-drain current that flows through the main power switch $Q_{mn}$ is controlled to a controlled current level $I_{CC}$ to maintain sufficient current to power the load. As in the first and second modes of power converter operation, the error amplifier 402 can be used to control current flowing to the output terminal 440, thereby regulating an output characteristic of the power converter.

Figure 5A:
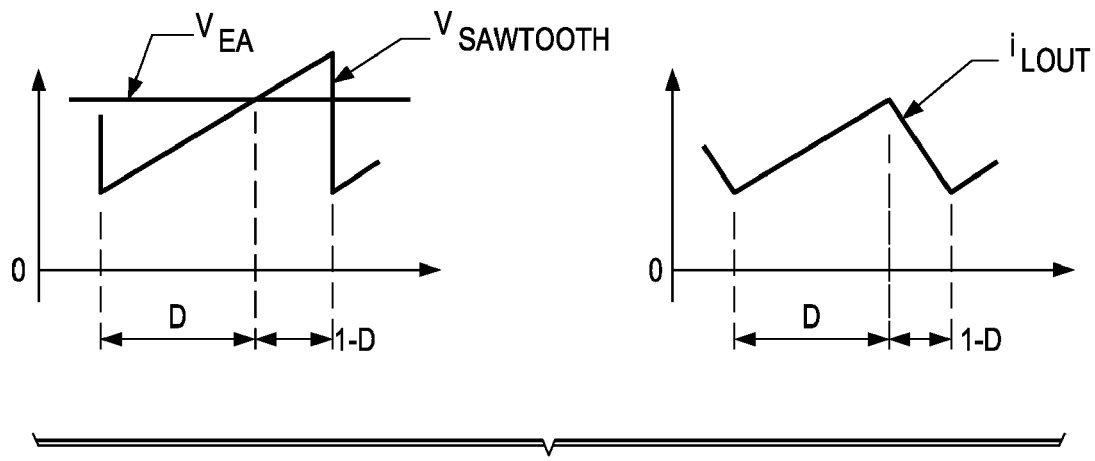
FIGS. 5A to 5D illustrate waveform diagrams of exemplary operations of a power converter in accordance with the principles of the present invention.

Turning now to FIGS. 5A to 5D, illustrated are waveform diagrams of exemplary operations of a power converter in accordance with the principles of the present invention. In the interest of maintaining continuity, the waveform diagrams will be described in part with reference to signals and components illustrated and described with respect to FIG. 4. More particularly, a left portion of FIG. 5A illustrates an error amplifier signal $V_{EA}$ produced by error amplifier 402 and a voltage sawtooth signal $V_{sawtooth}$ produced by a sawtooth voltage generator (not shown) in the first mode of power converter operation. When the error amplifier signal $V_{EA}$ is greater than the voltage sawtooth signal $V_{sawtooth}$ produced by the sawtooth voltage generator, the comparator 414 illustrated in FIG. 4 sets the primary duty cycle D of the switching cycle. In the right portion of FIG. 5A is a graphical representation of the resulting current that flows through output inductor $L_{out}$. During the primary duty cycle D of the switching cycle, the current flowing through the output inductor $L_{out}$ increases, and during the complementary duty cycle 1-D, the current decreases. In the right portion of FIG. 5A, the load current is sufficiently high so that current in output inductor $L_{out}$ does not reverse.

Figure 5B:
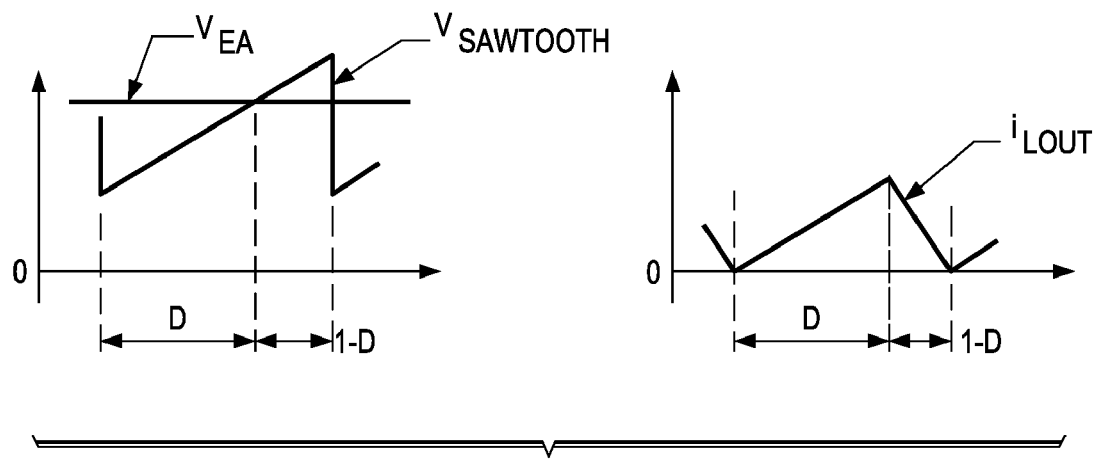

Referring now to FIG. 5B, illustrated in the left portion of the FIGURE again is a graphical representation of the error amplifier signal $V_{EA}$ produced by error amplifier 402 and the voltage sawtooth signal $V_{sawtooth}$ produced by a sawtooth voltage generator, again in the first mode of power converter operation. In the right portion of FIG. 5B, the current flowing through output inductor $L_{out}$ is again illustrated. In this case, the current flowing through output inductor $L_{out}$ reaches zero at the end of the switching cycle, but does not reverse direction, thus preserving operation in the first mode of operation.

Figure 5C:
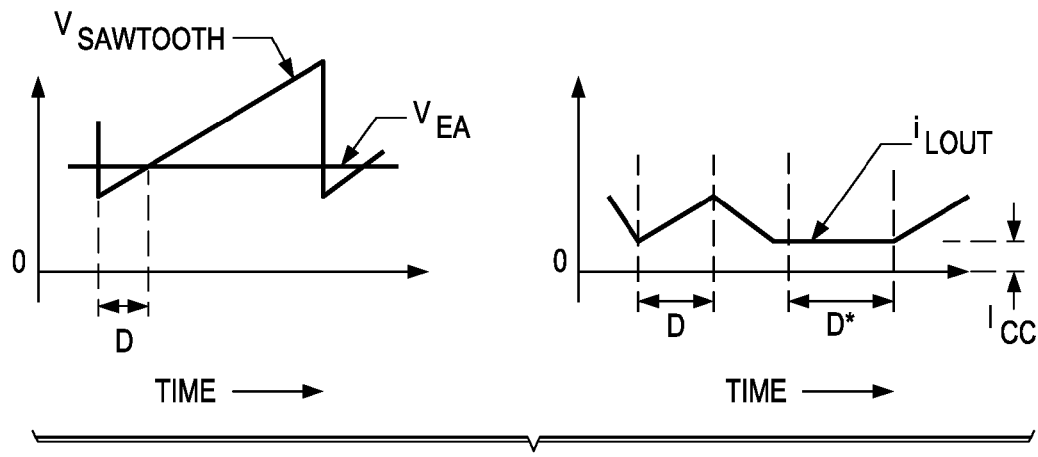

Referring now to FIG. 5C, illustrated in the left portion of the FIGURE is a graphical representation of the error amplifier signal $V_{EA}$ produced by error amplifier 402 and the voltage sawtooth signal $V_{sawtooth}$ produced by a sawtooth voltage generator in a second mode of power converter operation. In the right portion of FIG. 5C, the current flowing through output inductor $L_{out}$ is again illustrated. In this case, the current flowing through output inductor $L_{out}$ would reach zero and reverse direction during a primary duty cycle D*. In this second mode of power converter operation, the output current is insufficient to prevent current reversal in output inductor $L_{out}$ unless accommodation is provided in the power converter. Accommodation is provided by the AND gate 420 illustrated in FIG. 4 that disables conduction in the auxiliary power switch $Q_{aux}$ when current flowing through inductor $L_{out}$ reaches zero or is less than zero. Thus, a controlled current level $I_{CC}$ is supplied to output inductor $L_{out}$ by controlling current flowing through the main power switch $Q_{mn}$. The result is a substantial reduction of ripple current conducted to output capacitor $C_{out}$, with attendant reduction in switching-induced losses in associated circuit components.

Figure 5D:
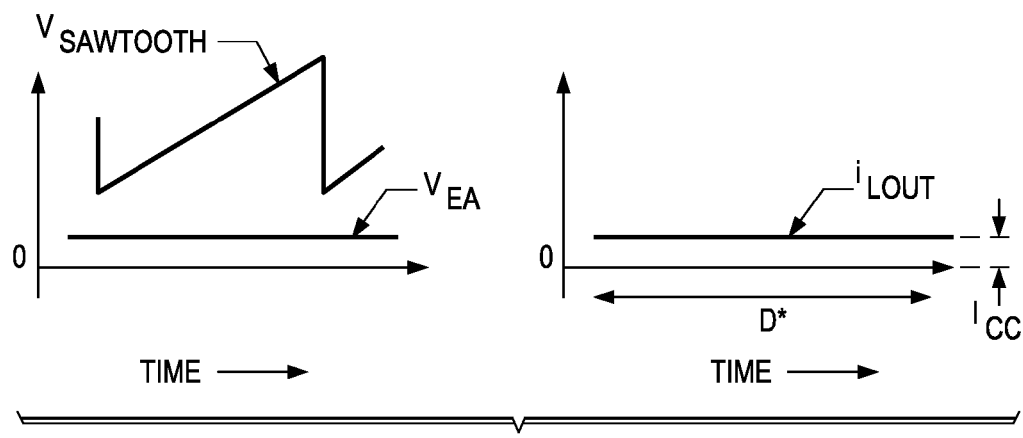

Referring now to FIG. 5D, illustrated in the left portion of the FIGURE is a graphical representation of the error amplifier signal $V_{EA}$ produced by the error amplifier 402 and the voltage sawtooth signal $V_{sawtooth}$ produced by a sawtooth voltage generator in a third mode of power converter operation. In this mode, the output current has been reduced even further so that output current can be sustained by the controlled current level $I_{CC}$ flowing through the main power switch $Q_{mn}$ without alternately enabling conduction through the auxiliary power switch $Q_{mn}$ and the main power switch $Q_{aux}$. In this mode, a reduced voltage level for the error amplifier signal $V_{EA}$ produced by the error amplifier 402 causes the error amplifier signal $V_{EA}$ to lie below even the valleys of the sawtooth waveform signal $V_{sawtooth}$. When the error amplifier signal $V_{EA}$ lies entirely below the sawtooth waveform signal $V_{sawtooth}$, the comparator 414 produces no duty cycle (e.g., disabling the duty cycle). As illustrated in the right portion of FIG. 5D, the current that flows through output inductor $L_{out}$ is the controlled current level $I_{CC}$ flowing through the main power switch $Q_{mn}$, controlled by error amplifier 402 by means of the current mirror as described previously. The result is an output current controlled by the error amplifier 402 that flows to the load without active switching of either the main power switch $Q_{mn}$ or the auxiliary power switch $Q_{aux}$ represented again by the primary duty cycle D*. Little to no ripple current is produced, and switching losses are substantially eliminated. Power conversion efficiency in this mode of operation is substantially improved and is determined by the ratio of output voltage to input voltage and remaining losses in the power converter elements. In this mode of operation, some controller elements can be selectively disabled to further reduce power losses.

If, in an alternative embodiment, the level of controlled current $I_{CC}$ for the main power switch $Q_{mn}$ is not controlled by the error amplifier 402 in response to actual load current at light levels of load current (i.e., a preselected level of controlled current level $I_{CC}$ is chosen), it is important that the preselected level of controlled current for the main power switch $Q_{mn}$ be less than the expected level of load current when the load is in a low-current state. Otherwise, output voltage of the power converter can increase beyond a desired voltage level.

Figure 6A:
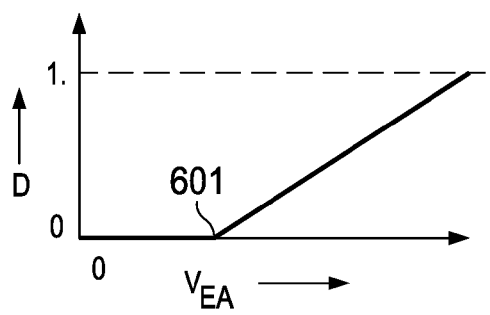
FIGS. 6A and 6B illustrate waveform diagrams of exemplary operations associated with a power switch of a power converter in accordance with the principles of the present invention.
Figure 6B:
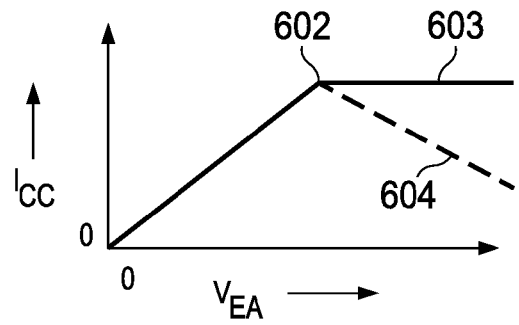

Turning now to FIGS. 6A and 6B, illustrated are waveform diagrams of exemplary operations associated with a power switch of a power converter in accordance with the principles of the present invention. In the interest of maintaining continuity, the waveform diagrams will be described in part with reference to signals and components illustrated and described with respect to FIG. 4. FIG. 6A illustrates a graphical representation of a primary duty cycle D resulting from the error amplifier signal $V_{EA}$ produced by error amplifier 402. When the error amplifier signal $V_{EA}$ is less than a threshold level represented by the point 601, no duty cycle is produced (e.g., disabling the duty cycle). When the error amplifier signal $V_{EA}$ is above this threshold level, primary duty cycle D increases linearly with the error amplifier signal $V_{EA}$ until it reaches 100%. In a preferred embodiment, the error amplifier 402 is constructed to produce an output error amplifier signal $V_{EA}$ that can fall below the minimum voltage of the sawtooth waveform signal $V_{sawtooth}$ to provide a mode of operation wherein no duty cycle is produced (e.g., disabling the duty cycle).

Referring now to FIG. 6B, illustrated is a graphical representation of the controlled level of current $I_{CC}$ that flows through the main power switch $Q_{nm}$ during the complementary duty cycle 1-D of the switching cycle as a function of the error amplifier signal $V_{EA}$ produced by error amplifier 402. In a preferred embodiment, above an error amplifier voltage represented by the point 602, the controlled current level $I_{CC}$ attains a saturation level 603. In an alternative embodiment, above the point 602, the controlled current level $I_{CC}$ is reduced for further increases in the error amplifier signal $V_{EA}$ beyond the point 602 produced by error amplifier 402 as represented by dashed line 604. The controlled current levels $I_{CC}$ illustrated in FIG. 6B are represented by straight lines, but in an alternative embodiment, it is contemplated that these lines may be implemented as nonlinear functions of the error amplifier signal $V_{EA}$ to produce further efficiency enhancements associated with a particular application.

Thus, as illustrated and described with reference to the accompanying drawings, a controller for a switch-mode power converter operable in a plurality of modes is constructed in an advantageous embodiment. The controller is preferably formed with a single error amplifier that is coupled to power converter elements to disable power switch conductivity upon reversal or reduction of a power converter current, and to provide a controlled current in a main power switch when an auxiliary power switch is disabled to conduct. It is contemplated within the broad scope of the invention that an operational mode can be changed based upon a power converter current, sensed or estimated, falling below a threshold level. It is further contemplated that a controller can be constructed with a plurality of error amplifiers to control an output characteristic in a plurality of operational modes. It is further contemplated that the controller can be constructed to operate in a plurality of operational modes based on sensing or estimating a parameter that may be an indirect indicator of an output characteristic such as an output current.

Those skilled in the art should understand that the previously described embodiments of a power converter and related methods of constructing the same are submitted for illustrative purposes only. In addition, other embodiments capable of producing a power converter employable with other switch-mode power converter topologies are well within the broad scope of the present invention. While the power converter has been described in the environment of a power converter including a controller to control an output characteristic to power a load, the power converter including a controller may also be applied to other systems such as a power amplifier, a motor controller, and a system to control an actuator in accordance with a stepper motor or other electromechanical device.

For a better understanding of power converters, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for a circuit having first and second switches configured to alternately enable conduction of said first and said second switches with a primary duty cycle and a complementary duty cycle, respectively, of a switching cycle in response to an output characteristic of said circuit and control a light level of current in said first switch when said second switch is substantially disabled to conduct during a part of said complementary duty cycle of said switching cycle.

2. The controller as recited in claim 1 wherein said controller includes an error amplifier configured to control said light level of current in said first switch.

3. The controller as recited in claim 1 wherein said controller is configured to disable conduction of said second switch in response to a sensed current.

4. The controller as recited in claim 1 wherein said controller includes a current minor configured to control said light level of current in said first switch.

5. The controller as recited in claim 1 wherein said circuit is a power converter and said controller is configured to disable conduction of said second switch in response to a sensed substantially reversed direction of current through an output inductor of said power converter.

6. The controller as recited in claim 1 wherein said controller is configured to disable said alternately enable conduction of said first and said second switches and control said light level of current in said first switch.

7. The controller as recited in claim 1 wherein said controller is configured to disable said alternately enable conduction of said first and said second switches and control said light level of current in said first switch in response to said output characteristic.

8. A method, comprising:
alternately enabling conduction of first and second switches with a primary duty cycle and a complementary duty cycle, respectively, of a switching cyclein response to an output characteristic of a circuit thereof; and
controlling a light level of current in said first switch when said second switch is substantially disabled to conduct during a part of said complementary duty cycle of said switching cycle.

9. The method as recited in claim 8 wherein said controlling is performed in accordance with an error amplifier.

10. The method as recited in claim 8 wherein said second switch is disabled to conduct in response to a sensed current.

11. The method as recited in claim 8 wherein said controlling is performed in accordance with a current mirror.

12. The method as recited in claim 8 wherein said circuit is a power converter and further comprising
disabling conduction of said second switch in response to a sensed substantially reversed direction of current through an output inductor of said power converter.

13. The method as recited in claim 8 further comprising disabling said alternately enable conduction of said first and said second switches and controlling said light level of current in said first switch.

14. The method as recited in claim 8 further comprising disabling said alternately enable conduction of said first and said second switches and controlling said light level of current in said first switch in response to said output characteristic.

15. A circuit, comprising:
first and second switches; and
a controller configured to alternately enable conduction of said first and said second switches with a primary duty cycle and a complementary duty cycle, respectively, of a switching cycle in response to an output characteristic of said circuit and control a light level of current in said first switch when said second switch is substantially disabled to conduct during a part of said complementary duty cycle of said switching cycle.

16. The circuit as recited in claim 15 wherein said controller includes an error amplifier configured to control said light level of current in said first switch.

17. The circuit as recited in claim 15 wherein said controller is configured to disable conduction of said second switch in response to a sensed current.

18. The circuit as recited in claim 15 wherein said controller includes a current minor configured to control said light level of current in said first switch.

19. The circuit as recited in claim 15 wherein said circuit is a power converter and said controller is configured to disable conduction of said second switch in response to a sensed substantially reversed direction of current through an output inductor of said power converter.

20. The circuit as recited in claim 15 wherein said controller is configured to disable said alternately enable conduction of said first and said second switches and control said light level of current in said first switch in response to said output characteristic.

* * * * *